United States Patent [19]
Fujitani et al.

[11] Patent Number: 5,496,424
[45] Date of Patent: Mar. 5, 1996

[54] HYDROGEN ABSORBING ALLOY AND PROCESS FOR PREPARING SAME

[75] Inventors: Shin Fujitani; Hiroshi Nakamura; Hiroshi Watanabe; Ikuo Yonezu; Toshihiko Saito, all of Moriguchi, Japan

[73] Assignee: Sanyo Electric Co., Ltd., Moriguchi, Japan

[21] Appl. No.: 131,617

[22] Filed: Oct. 5, 1993

[30] Foreign Application Priority Data

Oct. 7, 1992 [JP] Japan ................................. 4-268746
Oct. 7, 1992 [JP] Japan ................................. 4-268747

[51] Int. Cl.$^6$ ........................................ C22F 1/10
[52] U.S. Cl. .................... 148/555; 148/501; 148/503; 148/505; 148/675; 420/900
[58] Field of Search ................................ 148/555, 501, 148/503, 505, 426, 429, 675; 420/416, 443, 445, 455, 900; 423/644

[56] References Cited

U.S. PATENT DOCUMENTS

| | | | |
|---|---|---|---|
| 4,142,300 | 3/1979 | Gruen et al. | 34/15 |
| 4,242,315 | 12/1980 | Bruning et al. | 252/184 |
| 4,744,946 | 5/1988 | Sasai et al. | 420/443 |
| 4,928,496 | 5/1990 | Wallace et al. | 62/46.2 |
| 5,085,944 | 2/1992 | Ebato et al. | 420/900 |
| 5,304,345 | 4/1994 | Fujitani et al. | 420/455 |

FOREIGN PATENT DOCUMENTS

| | | |
|---|---|---|
| 59-28624 | 7/1984 | Japan . |
| 59-28625 | 7/1984 | Japan . |
| 59-28628 | 7/1984 | Japan . |

OTHER PUBLICATIONS

J. Japan Inst. Metals, vol. 56, No. 8, (1992), pp. 965–972.
Derwent Abstract of JP 5–222474 (Aug. 31 1993).
Patent Abstract of Japan, vol. 016, No. 244 (C–0947) (Jun. 4, 1992) of JP 4–052242 (Feb. 20, 1992).
Yonezu et al., *Denki Kagaku*, vol. 58, No. 8, pp. 742–747 (1990) (Abstract).

*Primary Examiner*—David A. Simmons
*Assistant Examiner*—Robert R. Koehler
*Attorney, Agent, or Firm*—Armstrong, Westerman, Hattori, McLeland & Naughton

[57] ABSTRACT

A hydrogen absorbing alloy represented by the general formula $R_{1-x}A_x(Ni_{5-y}B_y)_z$ wherein R is Mm (misch metal) or La, A is at least one element selected from the group consisting of Ce, Nd, Pr, Sm and Y, B is at least one element selected from the group consisting of Al, Sn, V, Cr, Mn, Fe, Co and Cu, $0 \leq x \leq 0.5$, $0 < y \leq 1.0$ and $0.8 \leq z \leq 1.2$. The alloy is prepared by subjecting an alloy material of the above composition to a heat treatment so that when the plateau region of the resulting hydrogen absorbing alloy is expressed by a normal cumulative distribution function wherein the hydrogen content of the alloy is taken as frequency and the logarithm of the equilibrium hydrogen pressure of the alloy as a random variable, the alloy is at least 0.04 to up to 0.10 in standard deviation $\sigma$.

6 Claims, 3 Drawing Sheets

HYDROGEN ABSORBING ALLOY AND PROCESS FOR PREPARING SAME

FIELD OF THE INVENTION

The present invention relates to hydrogen absorbing alloys suitable as functional materials for use in heat pumps and like heat utilizing systems and a process for preparing the same.

Heat utilizing systems have been developed wherein use is made of the hydrogen absorbing function of hydrogen absorbing alloys. Rare-earth element-Ni alloys are known as hydrogen absorbing alloys which are especially excellent in hydrogen absorbing-desorbing cycle life and which have an equilibrium hydrogen pressure that is easy to handle in the range of ordinary temperatures.

The equilibrium reaction between the hydrogen absorbing alloy and hydrogen is evaluated with reference to a hydrogen pressure-composition (hydrogen content) isotherm. As shown in FIG. 1, the hydrogen pressure-composition isotherm (P-C-T characteristics curve) has a hydrogen solid solution region ($\alpha$ phase) and a metal hydride region ($\beta$ phase) which have a great gradient, and a flat plateau region therebetween.

The inclination of the plateau region is a very important factor for improving the thermal efficiency or performance of heat utilizing systems. It is required that the plateau region be flat and as small as possible in pressure variations at varying hydrogen contents.

We have already proposed a method of quantitatively evaluating the flatness of plateau regions for hydrogen absorbing rare-earth element-Ni alloys (J. Japan Inst. Metals, Vol. 56, No. 8, pp. 965–972(1992)). This method is based on the finding that when the plateau region of the hydrogen absorbing alloy is expressed by a normal cumulative distribution function using the hydrogen content as frequency and the logarithm of equilibrium hydrogen pressure as a random variable, the standard deviation of the function (hereinafter referred to as a "plateau flatness parameter"), $\sigma$, properly represents the inclination of the plateau region due to the metallurgical inhomogeneity of the alloy phase.

In the above method of evaluation, the plateau region is modeled by a normal cumulative distribution function (n.c.d.f.)$\phi$ using the logarithm $\ln(P/P_0)$ of the ratio of the equilibrium hydrogen pressure P to unit pressure Po (=0.1 MPa) as a random function and the hydrogen content X as frequency.

Thus, the distribution of $\ln(P/P_0)$ values is considered to be the normal probability density function $\phi$ of standard deviation $\sigma$ and mean $m=\ln(P_m/P_0)$ as expressed by Equation (1)

$$\phi(\ln (P/P_0); m, \sigma) = (1/\sqrt{2\pi}) \exp(-t^2/2) \quad (1)$$

where $$t = (\ln (P/P_0) - m)/\sigma, \quad m = \ln (P_m/P_0) \quad (2)$$

Accordingly, the normal cumulative distribution function $\psi$ obtained by integrating the normal probablility density function $\phi$ is expressed by Equation (3).

$$\psi(\ln (P/P_0); m, \sigma) = \int_{-\infty}^{\ln (P/P_0)} \phi(\ln (P/P_0); m, \sigma) \, d\ln (P/P_0) \quad (3)$$

The normal cumulative distribution function $\psi$ as scaled with the width of the plateau region, $X\beta-X\alpha$, is taken as the hydrogen content component Xp of the plateau region.

$$X_P = (X_\beta - X_\alpha)\psi(\ln(P/P_0); m, \sigma) \quad (4)$$

The above evaluation method is based on the premise that the chemical potential of the hydrogen in the alloy corresponding to the plateau pressure P is statistically distributed owing to the heterogeneity in the structure or composition of the alloy, such as grain boundary and segregation, or to crystallographic heterogeneity such as dislocation and stacking fault.

The standard deviation $\sigma$ can therefore be an objective index indicating the plateau inclination and also the heterogeneity of the alloy.

On the other hand, it has been proposed to subject hydrogen absorbing alloys to a heat treatment for up to 10 hours in order to provide a flattened plateau region (Examined Japanese Patent Publications SHO 59-28624, -28625 and -28626).

The broken line in FIG. 5 represents a conventional process for preparing hydrogen absorbing alloys. The process comprises the first step (point A to point B') of solidifying a molten alloy having a temperature Tm and specified composition by slow cooling to room temperature Tr, and the subsequent second step (point C' to point D') of heat-treating the solidified alloy.

In heat utilizing systems wherein a hydrogen absorbing alloy is used as a functional material, we have investigated the influence of the plateau flatness parameter $\sigma$ on the system, and reached the conclusion that the plateau flatness parameter should be limited at least to not greater than 0.10 to obtain practically useful performance.

However, when the hydrogen absorbing alloys used in conventional heat utilizing systems were checked for the plateau flatness parameter $\sigma$ using the foregoing evaluation method, all the alloys were found to be in excess of 0.1 in this value as will be apparent from Table 1 given later to show some of the results, and were unsatisfactory as such alloys in characteristics.

Further the known heat treatment intended to flatten the plateau was found unable to diminish the plateau flatness parameter $\sigma$ to 0.10 or smaller presumably because the alloy is heated by the treatment at a temperature of higher than the melting point of the substituted element segregating during melting and casting so that the element forms a compound upon reacting with the component of the base phase which substantially affects absorption and desorption of hydrogen, or because the heat treatment is insufficient.

SUMMARY OF THE INVENTION

An object of the present invention is to provide a hydrogen absorbing alloy which is up to 0.10 in plateau flatness parameter $\sigma$ and to a process for preparing the alloy.

The present invention provides a hydrogen absorbing alloy having a structure of $CaCu_5$-type hexagonal system and represented by the general formula $R_{1-x}A_x(Ni_{5-y}B_y)_z$ wherein R is Mm (misch metal) or La, A is at least one element selected from the group consisting of Ce, Nd, Pr, Sm and Y, and B is at least one element selected from the group consisting of Al, Sn, V, Cr, Mn, Fe, Co and Cu. Further in the general formula, x, y and z are in the respective ranges of $0 \leq x \leq 0.5$, $0 < y \leq 1.0$ and $0.8 \leq z \leq 1.2$.

Furthermore, the hydrogen absorbing alloy is at least 0.04 to up to 0.10 in plateau flatness parameter $\sigma$.

The present invention further provides a process for preparing the hydrogen absorbing alloy which process comprises heating a hydrogen absorbing alloy having the above composition and thereafter cooling the alloy for a heat treatment, the heating temperature and time being so determined that the resulting alloy is at least 0.04 to up to 0.10 in the plateau flatness parameter σ.

The above value of plateau flatness parameter σ can be realized industrially by determining the heating temperature T (K) and heating time t from Equation (5).

$$ln\sigma = a - b \cdot t \cdot exp[-c/T] \tag{5}$$

wherein a, b and c are constant dependent on the composition of the alloy.

In this case, the heating temperature T can be set to not higher than the melting point of B, and the heating time t to the range of 15 hours to 100 hours.

With the hydrogen absorbing alloy stated above, the Ni in the $RNi_5$ alloy of $CaCu_5$-type hexagonal system having ability to absorb and desorb a large quantity of hydrogen is replaced by an element which forms an intermetallic compound with Ni or which forms a complete solid solution. This prevents deterioration of the alloy due to single liberation of Ni that occurs when absorption and desorption of hydrogen are repeated to impart improved durability to the alloy.

On the other hand, the substitution of the above element for Ni results in a greatly reduced equilibrium hydrogen pressure. To avoid this, R is replaced by at least one of Ce, Nd, Pr, Sm and Y which are capable of greatly increasing the equilibrium hydrogen pressure and enable the alloy to retain the ability to absorb and desorb a large quantity of hydrogen. The hydrogen absorbing alloy thus provided has a high equilibrium hydrogen pressure (at least 5 to 10 atm. at around room temperature) as required of heat pumps or the like for energy conversion, great ability to absorb hydrogen and high durability to withstand repeated hydrogen absorption and desorption.

For the alloy to retain the ability to absorb and desorb a large quantity of hydrogen, the amount x of Ce, Nd, Pr, Sm or Y to be substituted for R is in the range of 0 to 0.5, the amount y of B to be substituted for Ni is in the range of 0 to 1.0, and the stoichiometric ratio z of the total amount of Ni and the substituent element B therefor to the total amount of R and A (Ce, Nd, Pr, Sm, Y) is in the range of 0.8 to 1.2.

The hydrogen absorbing alloy having the above composition is adjusted to at least 0.04 to up to 0.10 in plateau flatness parameter σ, whereby the alloy is given higher homogeneity from the viewpoint of its structure or composition and crystallography, with the result that the P-C-T characteristics curve thereof has an almost horizontal plateau region.

The hydrogen absorbing alloy embodying the present invention can be prepared by subjecting an alloy having the above composition to a heat treatment under specified conditions (heating temperature T (°C.) and heating time t) for the following reason.

When the alloy of the same composition as described above has not been heat-treated after melting and casting, segregation of the substituted element B is found in the alloy which is responsible for the inclination of the plateau.

Accordingly, we analyzed a nonsteady diffusion model of the alloy having the segregation and consequently found that the quantitative relationship expressed by Equation (5) is established between the heat-treatment conditions (temperature T° C. and heat-treating time t) and the plateau flatness parameter σ. This relationship has been substantiated also by experiments.

FIG. 2, the solid line represents Equation (5) in the form of a graph. The graph reveals that the heat treatment must be conducted for at least a certain period of time to realize a plateau flatness parameter σ of up to 0.1.

However, the conventional heat treatments were all conducted for less than 10 hours and therefore resulted in plateau flatness parameter values σ in excess of 0.1.

The heating temperature T and the heating time t required for realizing a desired plateau flatness parameter σ (0.04 to 0.10) can be determined based on Equation (5) which is the result of theoretical analysis or on the relationship between the plateau flatness parameter σ and the heat-treatment conditions as established by experiments.

We have investigated into the possibility of producing alloys having a plateau flatness parameter σ of 0.04 to 0.10 with a heat-treating time of at least 10 hours and consequently found that all of such alloys with the required parameter σ can be obtained by conducting the heat treatment under industrially feasible conditions, i.e., at a temperature of not higher than the melting point of the component B for up to 100 hours.

Incidentally, if x, y and z exceed the respective ranges of $0 \leq x \leq 0.5$, $0 < y \leq 1.0$ and $0.8 \leq z \leq 1.2$, component elements other than B or compounds thereof become markedly segregated, making it impossible to obtain a hydrogen absorbing alloy which is up to 0.10 in plateau flatness parameter σ.

When giving a plateau flatness parameter σ of less than 0.040, there arises a need to conduct the heat treatment for more than 100 hours. The alloy preparing process is then not suitable as an industrial process.

The hydrogen absorbing alloy of the present invention is up to 0.10 in plateau flatness parameter σ and is therefore usable as a functional material for heat utilizing systems, enabling the system to exhibit improved performance for actual use.

Further when the process of the invention is used, hydrogen absorbing alloys having a plateau flatness parameter σ of up to 0.10 can be easily prepared by a heat treatment which is industrially feasible.

The present invention provides another process for preparing a hydrogen absorbing alloy which process comprises the first step of quenching an alloy in a molten state and having the foregoing composition at a cooling rate of at least $2 \times 10^3$ K/sec (FIG. 5, solid line A to B), and the second step of subjecting the alloy resulting from the first step to a heat treatment at a predetermined temperature To for a predetermined period of time to (FIG. 5, solid line C to D). The heat-treatment temperature To of the second step is set to a level not higher than the melting point of the component B.

When the alloy as cast and to be treated is subjected to slow cooling at a cooling rate of less than $2 \times 10^3$ K/sec as in the prior art, the substituted element represented by B segregates to cause inclination of the plateau. The segregation is inhibited by a known heat treatment to flatten the plateau to some extent, whereas the heat treatment needs to be conducted for a long period of time, e.g., for at least 10 hours to lower the plateau flatness parameter σ to about 0.1.

According to the present invention, on the other hand, the alloy as cast is quenched in the first step at a cooling rate of at least $2 \times 10^3$ K/sec, whereby the segregation of the substituted element represented by B can be remarkably inhibited to greatly diminish the plateau flatness parameter σ to not greater than 0.10.

The alloy can be quenced in the first step, for example, by the known liquid quenching roll solidification method or atomizing method. Although the first step produces nonuniform strain in the crystals of the cast alloy, this strain is effectively removed by the heat treatment of the second step.

Since the second step is intended to remove nonuniform strain from the crystals, a satisfactory result can be obtained by heat-treating the cooled alloy at a temperature of not higher than the melting point of the component B for a short period of time, e.g., for about 1 hour. Consequently, the process affords a hydrogen absorbing alloy which is up to 0.10 in plateau flatness parameter σ.

If the heat-treating temperature is higher than the melting point of the component B, the component B is likely to segregate at the alloy portion where the strain of crystals is great. The temperature is therefore preferably not higher than the melting point of the component B.

Even in the case where the process of the invention is practiced for hydrogen absorbing alloys which contain V, Cr, Mn, Fe or Co having a high melting point of at least 1100° C. as the component B, the alloy structure is readily made homogeneous by an increased diffusion rate, hence a favorable result.

DETAILED DESCRIPTION OF EMBODIMENTS

First, the relationship between the plateau flatness parameter σ and the heat-treatment conditions is determined by analyzing a nonsteady diffusion model representing an $LaNi_{5-y}M_y$ alloy wherein Ni is partly replaced by an element M, and segregation has occurred.

Generally, variations in the concentration y along x-axis with time t can be expressed by a nonsteady diffusion model of Equation (6).

$$\frac{\partial y(x, t)}{\partial t} = D \frac{\partial^2 y(x, t)}{\partial x^2} \tag{6}$$

Figure 3:
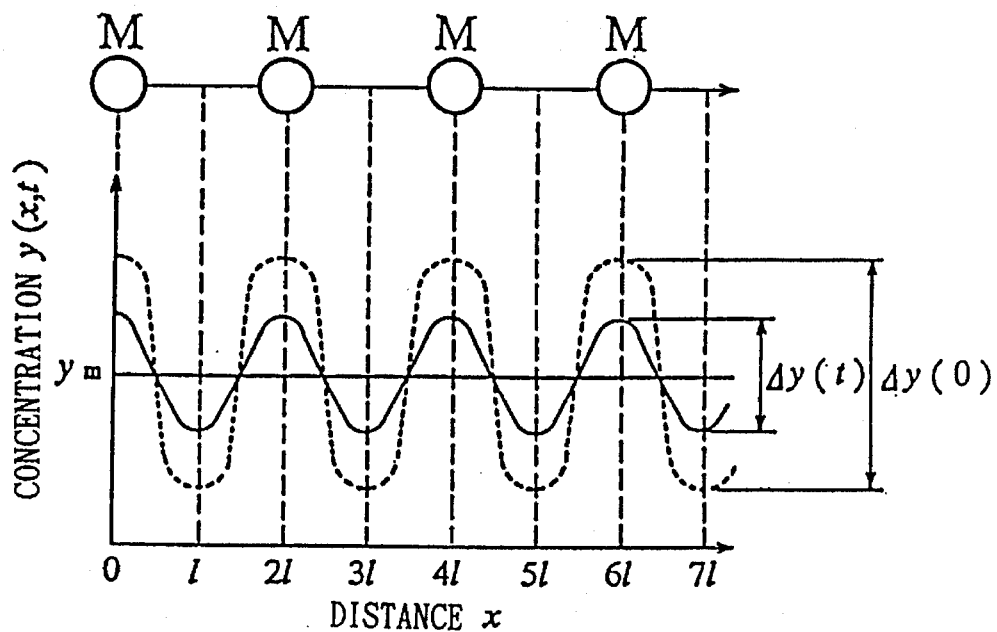
FIG. 3 is a diagram for illustrating a non-steady diffusion model of segregated component when an alloy with segregation is heat-treated.

Now, the concentration distribution of the substituted element M in the alloy with segregation is represented by a cosine curve as indicated in a broken line in FIG. 3, and the pitch of arrangement of the substituted element M is expressed by 2×l. The boundary condition is then defined by Equation (7), and the initial condition by Equation (8).

$$\frac{\partial y(0, t)}{\partial t} = \frac{\partial y(l, t)}{\partial t} = 0 \tag{7}$$

$$y(x, t) = y_m + \frac{\Delta y(0)}{2} \cos\left(\frac{\pi}{l}\right) x \tag{8}$$

Solving Equation (6) under these boundary condition and initial condition gives Equation (9) below.

$$y(x, t) = y_m + \Delta y(0) \exp\left[-\left(\frac{\pi}{l}\right)^2 Dt\right] \cos\left(\frac{\pi}{l}\right) x \tag{9}$$

The variation Δy in the concentration y resulting in the inclination of the plateau decreases from Δy(0) to Δy(t) in time t as represented by a solid line in FIG. 3. This Δy(t) is derived from Equation (9) as expressed by Equation (10) below.

$$\Delta y(t) = y(0, t) - y(l, t) \tag{10}$$

$$= \frac{\Delta y(0)}{2} \exp\left[-\left(\frac{\pi}{l}\right)^2 Dt\right] \cos\left(\frac{\pi}{l}\right) x$$

Figure 4:
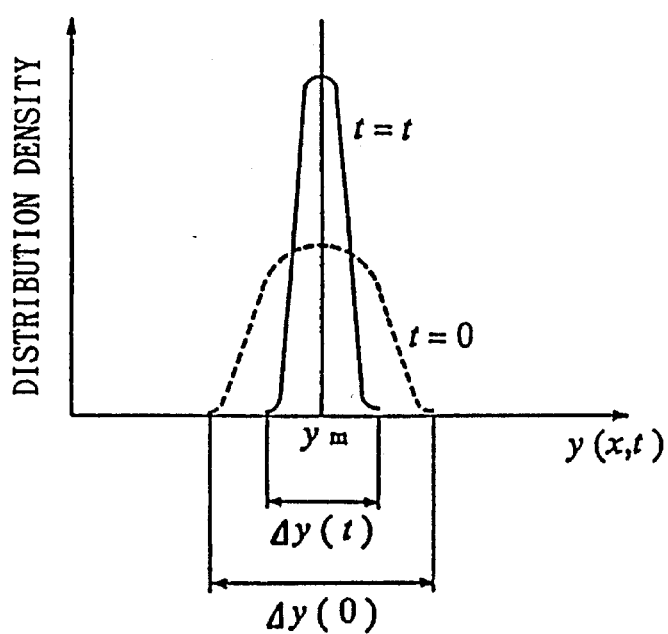
FIG. 4 is a graph showing a change in the distribution of concentrations in the same model due to a heat treatment.
Figure 5:
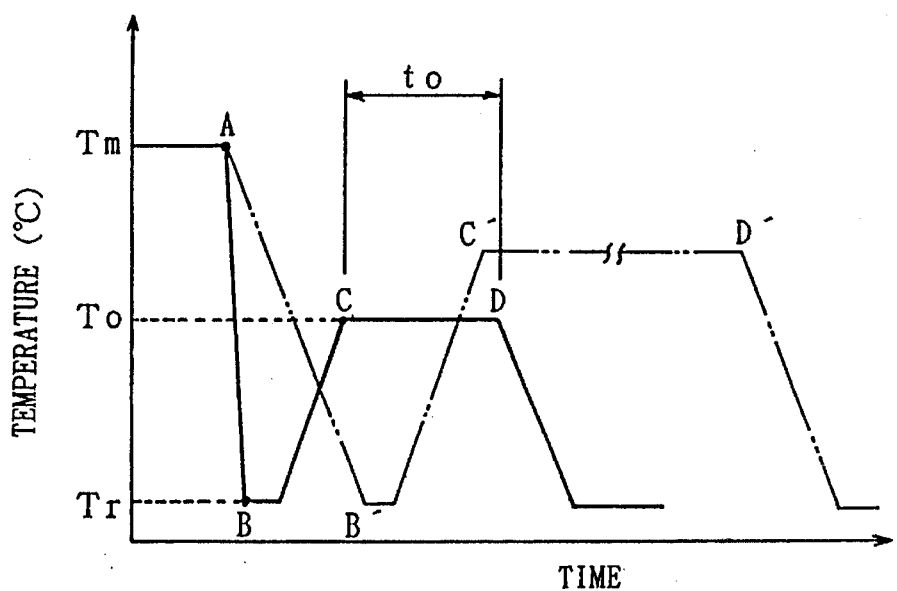
FIG. 5 is a graph showing changes in the temperature of alloy during preparation of hydrogen absorbing alloys.
Figure 6:
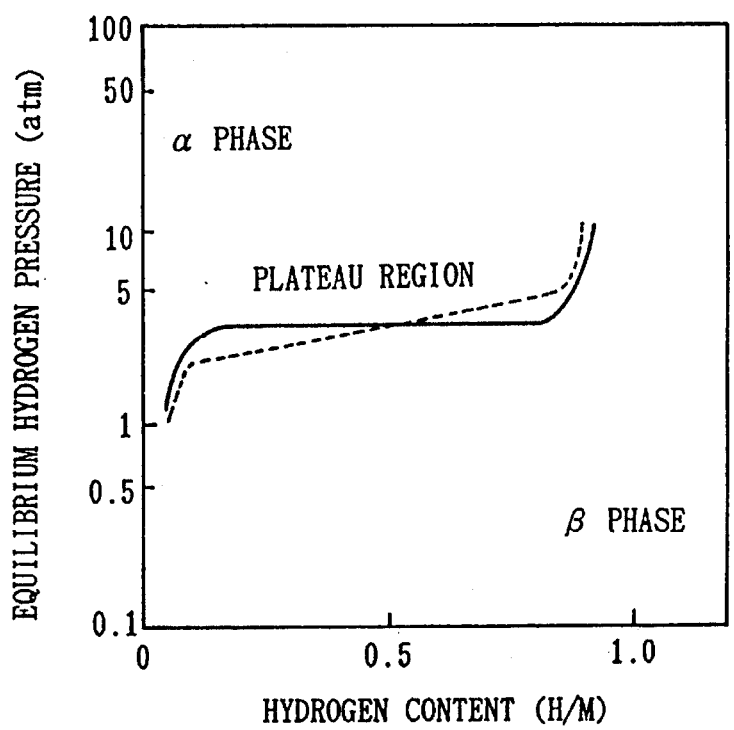
FIG. 6 is a graph showing P-C-T characteristics curves obtained in another example.

The concentration distribution of M in the alloy changes from the initial state (t=0) in which the standard deviation σ is great as indicated by a broken line in FIG. 4 to a state wherein the standard deviation σ is small as indicated by a solid line, time t later.

It is known that the logarithm of the equilibrium hydrogen pressure P of the $LaNi_{5-y}M_y$ alloy varies in proportion to the amount of substitution y as expressed by Equation (11).

$$\ln\left(\frac{P}{P_0}\right) = \ln\left(\frac{P_{LaNi5}}{P_0}\right) - ay \tag{11}$$

Accordingly, the relationship represented by Equation (12) and Equation (13) is obtained between the variation Δy in the concentration y and the standard deviation σ.

$$\sigma = a\sigma_y = a\frac{\Delta y(t)}{k} \tag{12}$$

$$\Delta y(t) = \frac{k\sigma(t)}{a}, \Delta y(0) = \frac{k\sigma(0)}{a} \tag{13}$$

The value k given above is a coefficient for converting the concentration variation Δy to the standard deviation $\sigma_y$ of the concentration distribution. In the case of a Gaussian distribution, the concentration variation Δy is approximately $6\sigma_y$, and k is therefore about 6.

Accordingly, Equations (10), (12) and (13) give Equation (14) below.

$$\ln \sigma(t) = \ln \sigma(0) - \left(\frac{\pi}{l}\right)^2 Dt \tag{14}$$

$$= \ln\left(a\frac{\Delta y(0)}{k}\right) - \left(\frac{\pi}{l}\right)^2 t D_0 \exp\left[-\frac{Q}{RT}\right]$$

Replacing the constants in Equation (14) by a, b and c affords the foregoing Equation (5).

The present invention will be described in greater detail with reference to the following examples.

Example 1

Specified amounts of Mm, Ni, Al, Mn and Co in the form of blocks were prepared as starting materials, and alloys No. 1, No. 2 and No. 5 were prepared by melting desired mixtures of these materials by high-frequency means as listed in Table 1. For these alloys, heat-treatment time t for giving a plateau flatness parameter σ of up to 0.1 was determined based on the constants a, b and c included in Equation (5) and determined by preliminary experiments, and the alloys were heat-treated.

The heat treatment was conducted in a vacuum. The heating temperature, which was determined in view of the melting point, vapor pressure, etc. of B, i.e., Al, Mn or Co, was 650° C. for Al (immediately below the melting point thereof), 950° C. for Mn, or 1000° C. for Co.

Mm used had the composition of 25 wt. % La, 51 wt. % Ce, 17 wt. % Nd and 7 wt. % others.

The alloy materials can be melted alternatively by arc melting or any other known method. The heat treatment may be carried out in argon gas or like inert gas atmosphere.

Table 1 shows the heat-treatment conditions employed according to the invention for the hydrogen absorbing alloys No. 1, No. 3 and No. 5, and the plateau flatness parameters σ of the alloys prepared under the specified heat-treatment conditions.

On the other hand, No. 2, No. 4 and No. 6 are hydrogen absorbing alloys prepared under conventional heat-treatment conditions. Table 1 also shows the heat-treatment conditions for each of these alloys and the plateau flatness parameter σ thereof.

The parameters σ listed were obtained by determining the P-C-T characteristics curve at 40° C., followed by calculation according to the foregoing evaluation method (J. Japan Inst. Metals, Vol. 56, No. 8, pp. 965–972 (1992)). The parameter σ represents the plateau flatness and also the homogeneity of the alloy phase and is an index distinguishing the alloy concerned from the others.

TABLE 1

| No. | Alloy | Heat-treatment conditions | | σ | Note |
| | | Temp. (°C.) | Time (hr) | | |
|---|---|---|---|---|---|
| 1 | MmNi$_{4.5}$Al$_{0.5}$ | 650 | 30 | 0.092 | Invention |
| 2 | MmNi$_{4.5}$Al$_{0.5}$ | 900 | 2 | 0.216 | Comparative |
| 3 | MmNi$_{4.5}$Mn$_{0.5}$ | 950 | 40 | 0.073 | Invention |
| 4 | MmNi$_{4.5}$Mn$_{0.5}$ | 950 | 2 | 0.110 | Comparative |
| 5 | MmNi$_{4.5}$Co$_{0.5}$ | 1000 | 80 | 0.055 | Invention |
| 6 | MmNi$_{4.5}$Co$_{0.5}$ | 1000 | 10 | 0.132 | Comparative |

Table 1 reveals that the hydrogen absorbing alloys No. 1, No. 3 and No. 5 of the present invention are all reduced to not higher than 0.100 in plateau flatness parameter σ, while all the conventional hydrogen absorbing alloys No. 2, No. 4 and No. 6 have a plateau flatness parameter σ in excess of 0.100.

Figure 1:
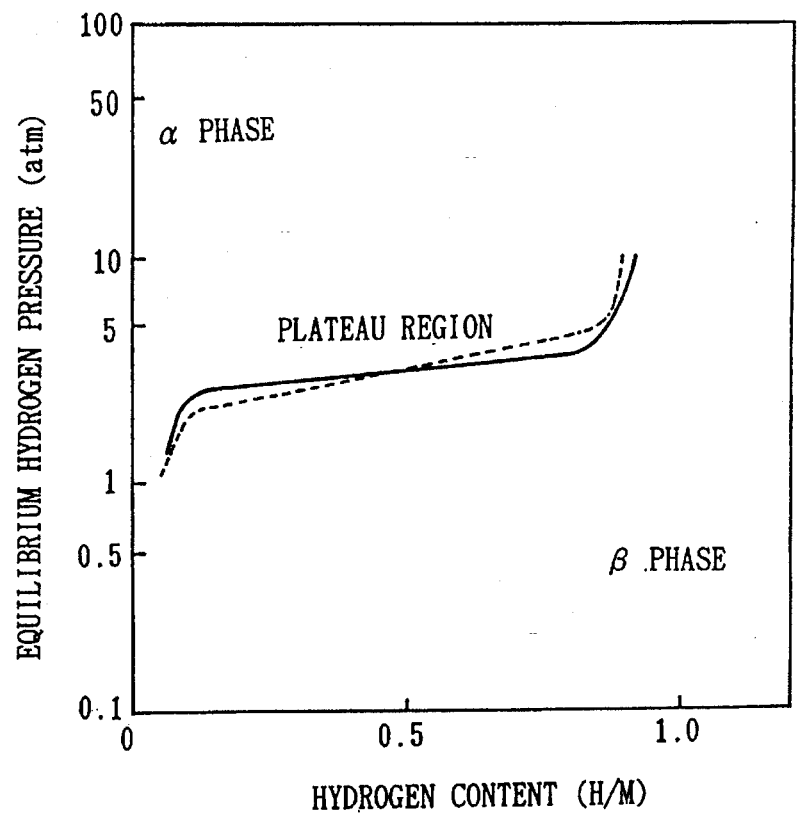
FIG. 1 is a graph showing P-C-T characteristics curves.

FIG. 1 shows the P-C-T characteristics curves of the hydrogen absorbing alloy of the invention in Example 1 (solid line) and the conventional hydrogen absorbing alloy (broken line) as determined at 40° C. The graph reveals that the alloy of the invention is smaller than the conventional alloy in the inclination of plateau.

Figure 2:
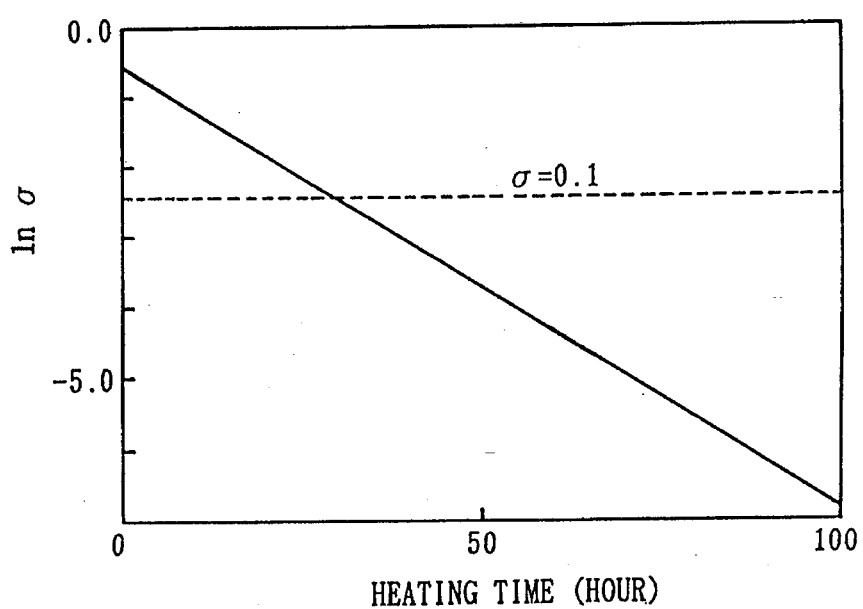
FIG. 2 is a graph showing the relationship between the plateau flatness parameter σ and the heating time t.

FIG. 2 shows the relationship between the plateau flatness parameter σ and the heat-treatment time t expressed by Equation (5) and as established for the hydrogen absorbing alloy No. 1 listed in Table 1 and heat-treated at a temperature of 650° C. which is below the melting point of Al. The broken line in the graph indicates the level of parameter σ of 0.100. The graph shows that when the heat-treatment temperature is 650° C. which is below the melting point of Al, the plateau flatness parameter σ is greater than 0.1 if the heat treatment is conducted for about 10 hours, but decreases to not higher than 0.1 when the time t exceeds 30 hours.

In the case of the alloy No. 1, the three constants of Equation (5) were a=-0.616, b=1.74×10$^8$ sec, and c=20.13×10$^3$K.

As described above, the conditions for the heat treatment to be conducted at a temperature of not higher than the melting point of the component B can be reasonably predicted according to the invention although difficult to predict in the prior art, consequently making it possible to prepare hydrogen absorbing alloys having a plateau flatness parameter σ of not greater than 0.100, i.e., excellent characteristics.

Example 2

Hydrogen absorbing alloys No. 7 to No. 26 were prepared according to the invention in the same manner as in Example 1 using blocks or lumps of La, Ce, Nd, Pr, Sm, Y, Mm, LRM (lanthanum-rich misch metal), Al, Sn, V, Cr, Mn, Fe, Co and Cu as starting materials. The same Mm as in Example 1 was used. LRM had the composition of: 41 wt. % La, 7 wt. % Ce, 39 wt. % Nd and 13 wt. % others.

The heat-treatment time was so determined as to give a plateau flatness parameter σ of 0.050 using the constants a, b and c included in Equation (5) and determined by preliminary experiments. Further the P-C-T characteristics curve of each of the alloys prepared by heat treatment was determined to calculate the actual plateau flatness parameter σ according to the foregoing evaluation method.

TABLE 2

| No. | Alloy | Heat-treatment conditions | | σ |
| | | Temp. (°C.) | Time (hr) | |
|---|---|---|---|---|
| 7 | LaNi$_{4.8}$Al$_{0.2}$ | 650 | 30 | 0.046 |
| 8 | LaNi$_{4.8}$Sn$_{0.2}$ | 220 | 40 | 0.067 |
| 9 | LaNi$_{4.8}$V$_{0.2}$ | 1100 | 80 | 0.056 |
| 10 | LaNi$_{4.8}$Cr$_{0.2}$ | 1100 | 80 | 0.083 |
| 11 | LaNi$_{4.8}$Mn$_{0.2}$ | 950 | 30 | 0.055 |
| 12 | LaNi$_{4.8}$Fe$_{0.2}$ | 1100 | 50 | 0.094 |
| 13 | LaNi$_{4.8}$Co$_{0.2}$ | 1000 | 70 | 0.043 |
| 14 | LaNi$_{4.8}$Cu$_{0.2}$ | 1000 | 70 | 0.068 |
| 15 | LaNi$_{4.6}$Al$_{0.2}$Mn$_{0.2}$ | 650 | 80 | 0.058 |
| 16 | LaNi$_{4.6}$Al$_{0.2}$Co$_{0.2}$ | 650 | 80 | 0.048 |
| 17 | LaNi$_{4.6}$Co$_{0.2}$Mn$_{0.2}$ | 1000 | 60 | 0.056 |
| 18 | MmNi$_{4.8}$Mn$_{0.2}$ | 950 | 40 | 0.062 |
| 19 | (LRM)Ni$_{4.8}$Mn$_{0.2}$ | 950 | 50 | 0.057 |
| 20 | La$_{0.8}$Ce$_{0.2}$Ni$_{4.8}$Mn$_{0.2}$ | 950 | 100 | 0.092 |
| 21 | La$_{0.8}$Nd$_{0.2}$Ni$_{4.8}$Mn$_{0.2}$ | 950 | 60 | 0.065 |
| 22 | La$_{0.8}$Pr$_{0.2}$Ni$_{4.8}$Mn$_{0.2}$ | 950 | 60 | 0.058 |
| 23 | La$_{0.8}$Sm$_{0.2}$Ni$_{4.8}$Mn$_{0.2}$ | 950 | 50 | 0.043 |
| 24 | La$_{0.8}$Y$_{0.2}$Ni$_{4.8}$Mn$_{0.2}$ | 950 | 30 | 0.042 |
| 25 | Mm$_{0.8}$Y$_{0.2}$Ni$_{4.8}$Mn$_{0.2}$ | 950 | 90 | 0.085 |
| 26 | (LRM)$_{0.8}$Y$_{0.2}$Ni$_{4.8}$Mn$_{0.2}$ | 950 | 80 | 0.052 |

Mm: Misch metal greater than 5 wt. % in Ce content.
LRM: Misch metal up to 5 wt. % in Ce content.

Consequently, the plateau flatness parameters σ were all not greater than 0.100 as shown in Table 2, and many of these values were approximate to the predicted value 0.050.

As will be apparent also from Examples 1 and 2, the present invention facilitates industrial production of hydrogen absorbing alloys having outstanding characteristics of up to 0.10 in plateau flatness parameter σ. Use of these alloys as functional materials makes it possible for the first time to realize heat pumps and like heat utilizing systems which exhibit useful performance.

No. 1, No. 3 and No. 5 and the plateau flatness parameters σ of the alloys prepared under the heat-treatment conditions.

On the other hand, alloys No. 2, No. 4 and No. 4 are hydrogen absorbing alloys prepared by the conventional process. Table 3 also shows the heat-treatment conditions for these alloys and the plateau flatness parameters σ thereof.

TABLE 3

| No. | Alloy | Heat-treatment conditions | | σ | Note |
| --- | --- | --- | --- | --- | --- |
| | | Temp. (°C.) | Time (hr) | | |
| 1 | $MmNi_{4.5}Al_{0.5}$ | 650 | 1 | 0.028 | Invention |
| 2 | $MmNi_{4.5}Al_{0.5}$ | 900 | 2 | 0.216 | Comparative |
| 3 | $MmNi_{4.5}Mn_{0.5}$ | 950 | 1 | 0.030 | Invention |
| 4 | $MmNi_{4.5}Mn_{0.5}$ | 950 | 2 | 0.110 | Comparative |
| 5 | $MmNi_{4.5}Co_{0.5}$ | 1000 | 1 | 0.022 | Invention |
| 6 | $MmNi_{4.5}Co_{0.5}$ | 1000 | 10 | 0.132 | Comparative |

Although the plateau region is expressed by a single normal cumulative distribution function, it is also possible to express the region by the sum of two normal cumulative distribution functions (see J. Japan Inst. Metals, Vol. 56, No. 8, p. 967(1992)). In this case, it is possible, for example, to handle either one of the standard deviations $\sigma_1$ and $\sigma_2$ of the two functions as a representative value.

Furthermore, the process of the present invention for preparing hydrogen absorbing alloys based on Equation (5) is not limited to $CaCu_5$-type alloys consisting primarily of a rare-earth element and Ni but is usable as it is for alloy systems having a plateau inclination due to the segregation of the component element.

The Other Process

Examples 1 and 2 given above are intended to diminish the plateau flatness parameter σ by adjusting the heating temperature and time for heat-treating molten alloys after cooling, while molten alloys are cooled at a high reate in Examples 3 and 4 to follow to shorten the heat-treatment time and decrease the plateau flatness parameter σ.

Example 3

Mixtures of specified amounts of particulate Mn, Ni, Al, Mm and Co serving as materials were melted by high-frequency means to obtain molten alloys, which were then quenched and solidified at a rate of $10^5$ to $10^6$ K/sec by the liquid quenching roll solidification method and thereafter heat-treated for 1 hour.

The heat treatment was conducted in a vacuum. The heat-treatment temperature To, which was determined in view of the melting point, vapor pressure, etc. of the component B, i.e., Al, Mn or Co, was 650° C. for Al (immediately below the melting point thereof), 950° C. for Mn or 1000° C. for Co.

The composition of Mm was 25 wt. % Ca, 51 wt. % Ce, 17 wt. % Nd and 7 wt. % of others.

The alloy materials can be melted alternatively by arc melting or any other known method. The heat treatment may be carried out in argon gas or like inert gas atmosphere.

Table 3 shows hydrogen absorbing alloys No. 1, No. 3 and No. 5 which were obtained by the above process. Also listed in Table 3 were the heat-treatment conditions for the alloys Table 3 shows that the hydrogen absorbing alloys No. 1, No. 3 and No. 5 of the invention all have a decreased plateau flatness parameter σ of up to 0.040 well below 0.100, whereas the conventional alloys No. 2, No. 4 and No. 6 are all over 0.100 in parameter σ.

FIG. 3 shows the P-C-T characteristics curves of the hydrogen absorbing alloy of the invention (solid line) and the conventional hydrogen absorbing alloy (broken line) in Example 3, as determined at 40° C. The graph reveals that the alloy of the invention is much smaller than the conventional one in the inclination of the plateau region.

When the alloys No. 1, No. 3 and No. 5 of Example 3 were checked by powder X-ray analysis before and after the heat treatement, a great decrease was found in the half-value width of the peak after the heat treatment, this indicating removal of nonuniform strain from the crystals.

Further the observation of the alloy structures by an electron beam probe microanalyzer revealed in the conventional alloys No. 2, No. 4 and No. 6 the segregation of the component B, i.e., Al, Mn or Co, even after the heat treatment, but the alloys of the invention No. 1, No. 3 and No. 5 were found free from such segregate.

As described above, the process of the invention for preparing hydrogen absorbing alloys by quenching and solidifying a molten alloy and heat-treating the alloy results in little or no heterogeneity in the alloy structure due to segregation and almost no heterogeneity in the alloy crystals due to nonuniform strain and gives the hydrogen absorbing alloy outstanding characteristics including a greatly reduced plateau flatness parameter σ of not greater than 0.040.

Example 4

Hydrogen absorbing alloys No. 7 to No. 26 listed in Table 4 were prepared by the same process as in Example 3 using particulate La, Ce, Nd, Pr, Sm, Y, Mm, LRM (lanthanum-rich misch metal), Al, Sn, V, Cr, Mn, Fe, Co and Cu as materials. Further in the same manner as in Example 3, the hydrogen pressure-composition isotherms of these alloys were determined to calculate the plateau flatness parameters σ thereof.

Mm was of the same composition as in Example 1. The LRM used had the composition of: 41 wt. % La, 7 wt. % Ce, 39 wt. % Nd and 13 wt. % of others.

TABLE 4

| No. | Alloy | σ |
|---|---|---|
| 7 | $LaNi_{4.8}Al_{0.2}$ | 0.023 |
| 8 | $LaNi_{4.8}Sn_{0.2}$ | 0.035 |
| 9 | $LaNi_{4.8}V_{0.2}$ | 0.031 |
| 10 | $LaNi_{4.8}Cr_{0.2}$ | 0.036 |
| 11 | $LaNi_{4.8}Mn_{0.2}$ | 0.024 |
| 12 | $LaNi_{4.8}Fe_{0.2}$ | 0.037 |
| 13 | $LaNi_{4.8}Co_{0.2}$ | 0.015 |
| 14 | $LaNi_{4.8}Cu_{0.2}$ | 0.028 |
| 15 | $LaNi_{4.6}Al_{0.2}Mn_{0.2}$ | 0.028 |
| 16 | $LaNi_{4.6}Al_{0.2}Co_{0.2}$ | 0.018 |
| 17 | $LaNi_{4.6}Co_{0.2}Mn_{0.2}$ | 0.025 |
| 18 | $MmNi_{4.8}Mn_{0.2}$ | 0.030 |
| 19 | $(LRM)Ni_{4.8}Mn_{0.2}$ | 0.025 |
| 20 | $La_{0.8}Ce_{0.2}Ni_{4.8}Mn_{0.2}$ | 0.036 |
| 21 | $La_{0.8}Nd_{0.2}Ni_{4.8}Mn_{0.2}$ | 0.024 |
| 22 | $La_{0.8}Pr_{0.2}Ni_{4.8}Mn_{0.2}$ | 0.024 |
| 23 | $La_{0.8}Sm_{0.2}Ni_{4.8}Mn_{0.2}$ | 0.021 |
| 24 | $La_{0.8}Y_{0.2}Ni_{4.8}Mn_{0.2}$ | 0.018 |
| 25 | $Mm_{0.8}Y_{0.2}Ni_{4.8}Mn_{0.2}$ | 0.035 |
| 26 | $(LRM)_{0.8}Y_{0.2}Ni_{4.8}Mn_{0.2}$ | 0.022 |

Mm: Misch metal greater than 5 wt.% in Ce content.
LRM: Misch metal up to 5 wt.% in Ce content.

Consequently, the plateau flatness parameters σ were all found to be not greater than 0.040 well below 0.100.

As will be apparent also from Examples 3 and 4, the present invention affords hydrogen absorbing alloys having outstanding characteristics including a plateau flatness parameter σ of up to 0.040. Use of these alloys realizes for the first time heat pumps and like heat utilizing systems which exhibit useful performance.

The production process of Examples 3 and 4 is not limited to $CaCu_5$-type alloys consisting mainly of a rare-earth element and Ni but is also applicable to various alloys having a plateau inclination due to the segregation of the component element with the same advantage as above.

The foregoing description of the embodiments and examples is given for illustrating the present invention and should not be interpreted as limiting the invention defined in the appended claims or reducing the scope thereof. The present invention is not limited to the embodiments and examples described but can of course be modified variously by one skilled in the art without departing the spirit of the invention as set forth in the claims.

What is claimed is:

1. A process for preparing a hydrogen absorbing alloy represented by the general formula $R_{1-x}A_x(Ni_{5-y}B_y)_z$ wherein R is Mm (misch metal) or La, A is at least one element selected from the group consisting of Ce, Nd, Pr, Sm and Y, B is at least one element selected from the group consisting of Al, Sn, V, Cr, Mn, Fe, Co and Cu, x is in the range of $0 \leq x \leq 0.5$, y is in the range of $0 < y \leq 1.0$ and z is in the range of $0.8 \leq z \leq 1.2$, and B is present in a measurable amount, said process comprising the steps of:

cooling a molten alloy at a controlled rate of $10^5$ to $10^6$ K/sec; and subjecting the resultant alloy to a heat treatment, so that a plateau region between a hydrogen solid solution region (α phase region) and a metal hydride region (β phase region) is flattened to a level of up to 0.04 with respect to a standard deviation σ of a normal cumulative distribution function ψ, whereupon said plateau region is evaluated by the normal cumulative distribution function ψ wherein the hydrogen content of the alloy is taken as frequency and the logarithm of a ratio of equilibrium hydrogen pressure P to unit pressure Po is taken as a random variable, said normal cumulative distribution function ψ being obtained by integrating a normal probability density function φ:

$$\psi(\ln(P/Po); m,\sigma) = \int_{-\infty}^{\ln(P/Po)} \phi(\ln(P/Po); m,\sigma) d\ln(P/Po)$$

provided that distribution of ln(P/Po) is considered to be the normal probability density function φ of the standard deviation σ and a mean value m, and is expressed by the following equation:

$$\phi(\ln(P/Po); m,\sigma) = (1/\sqrt{2\pi}) \exp(-t^2/2)$$

where $t=(\ln(P/Po)-m)/\sigma$, and $m=\ln(Pm/Po)$, said hydrogen content being determined by the following equation wherein said normal cumulative distribution function is scaled with the width $X_\beta - X_\alpha$ of the plateau region:

hydrogen content=$(X_\beta - X_\alpha)\psi(\ln(P/Po); m,\sigma)$.

2. The process defined in claim 1 wherein the heat treatment is conducted at a temperature of not higher than the melting point of component B, said component B being present in the alloy in a measurable amount.

3. The process as defined in claim 1 wherein x of the alloy is in the range of $0.2 \leq x \leq 0.5$.

4. The process as defined in claim 1 wherein y of the alloy is in the range of $0.2 \leq y \leq 1.0$.

5. The process as defined in claim 1 wherein x of the alloy is in the range of $0.05 \leq x \leq 0.5$.

6. The process as defined in claim 1 wherein y of the alloy is in the range of $0.05 \leq y \leq 1.0$.

* * * * *